Feb. 20, 1962 M. S. DIETZ 3,021,770
PHOTOGRAPHIC SHUTTER
Filed Sept. 29, 1958 2 Sheets-Sheet 2

INVENTOR.
Milton S. Dietz
BY
Brown and Mikulka
ATTORNEYS 3,021,770
PHOTOGRAPHIC SHUTTER
Milton S. Dietz, Cambridge, Mass., assignor to Polaroid
 Corporation, Cambridge, Mass., a corporation of Delaware
Filed Sept. 29, 1958, Ser. No. 763,859
8 Claims. (Cl. 95—54)

This invention relates to photography and, more particularly, to novel shutter and diaphragm mechanisms.

A principal object of the present invention is to provide a novel, simple and inexpensive shutter mechanism including an exposure-interval controlling element operatively associated with an aperture-magnitude controlling element for providing a plurality of discrete operational settings of said elements to accurately predetermine exposure values.

Another object of the present invention is to provide in a camera shutter, including a movable shutter blade for establishing exposure intervals and a diaphragm element for providing an effective exposure aperture, means for controlling the speed of movement of said blade and being operatively coupled with said diaphragm element to provide predetermined exposure values.

A further object of the present invention is to provide in a camera shutter, including a variable diaphragm means for providing effective exposure apertures and a shutter blade mounted for movement across said aperture for effecting exposures, a pneumatic means for variably controlling the speed of movement of said blade across said aperture and control means for operatively coupling said pneumatic means with said diaphragm means for providing predetermined exposure values.

Further objects of the present invention are to provide, in a shutter of the above type, a movable element for controlling the operative coupling of said pneumatic means and said diaphragm means, said movable element having inscribed thereon a fixed index and being movable for positioning said index adjacent at least one of a plurality of indicia representing a corresponding plurality of exposure values thereby establishing a shutter speed and a corresponding effective diaphragm aperture to provide a predetermined exposure; and to provide a shutter of the type hereinbefore described having a single control element for varying both shutter speed and effective exposure aperture.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a plan view of the diaphragm and diaphragm control means of the shutter of FIG. 1;

FIG. 4 is a section taken along the line 4—4 of FIG. 1; and

Generally, the present invention comprehends a novel shutter which is simple and inexpensive in construction and adapted to be set to a desired one of a plurality of accurately predetermined exposure values. The shutter preferably includes an exposure-interval determining means such as a pivotal shutter blade having therein an opening. The shutter blade is pivotable between a position of rest wherein said opening is positioned to one side of the lens aperture and cocked or set position wherein the opening is positioned to the other side of the lens aperture. As a means for moving the shutter blade from rest to cocked position, there is provided an element including a cover-blind which covers the lens aperture as the opening in the blade moves across the aperture. Resilient means are provided for moving the shutter blade from cocked to rest position, the cover-blind being positioned to one side of the lens aperture during this movement of the shutter blade as the opening passes across and uncovers the lens aperture. The exposure period, which defines the shutter speed as referred to herein, is determined by the size of the slot and is also variably determined by the speed of movement of the opening across the lens aperture. A pneumatic means, such as a bellows, is provided for controlling or limiting the speed of movement of the shutter blade from the cocked to the rest position. As a means for controlling the time rate of change of axial dimension (such as expansion or collapse) of the bellows, the invention preferably comprises a manually operable control-valve mechanism which controls the flow of air in or out of the bellows. A double-bladed linkage type diaphragm cooperating with the exposure aperture is preferably provided as a means for establishing an effective exposure aperture. For moving the diaphragm to various positions to alter the effective exposure aperture, cam means are provided in the preferred form. Means are included for directly coupling the cam means with the control-valve mechanism, both the function of the cam means and of the control-valve mechanism being governed, for instance, by manual operation of a single control knob having an indexing system for indicating the setting of exposure value for predetermined combinations of shutter speed and effective exposure aperture.

Figure 1:
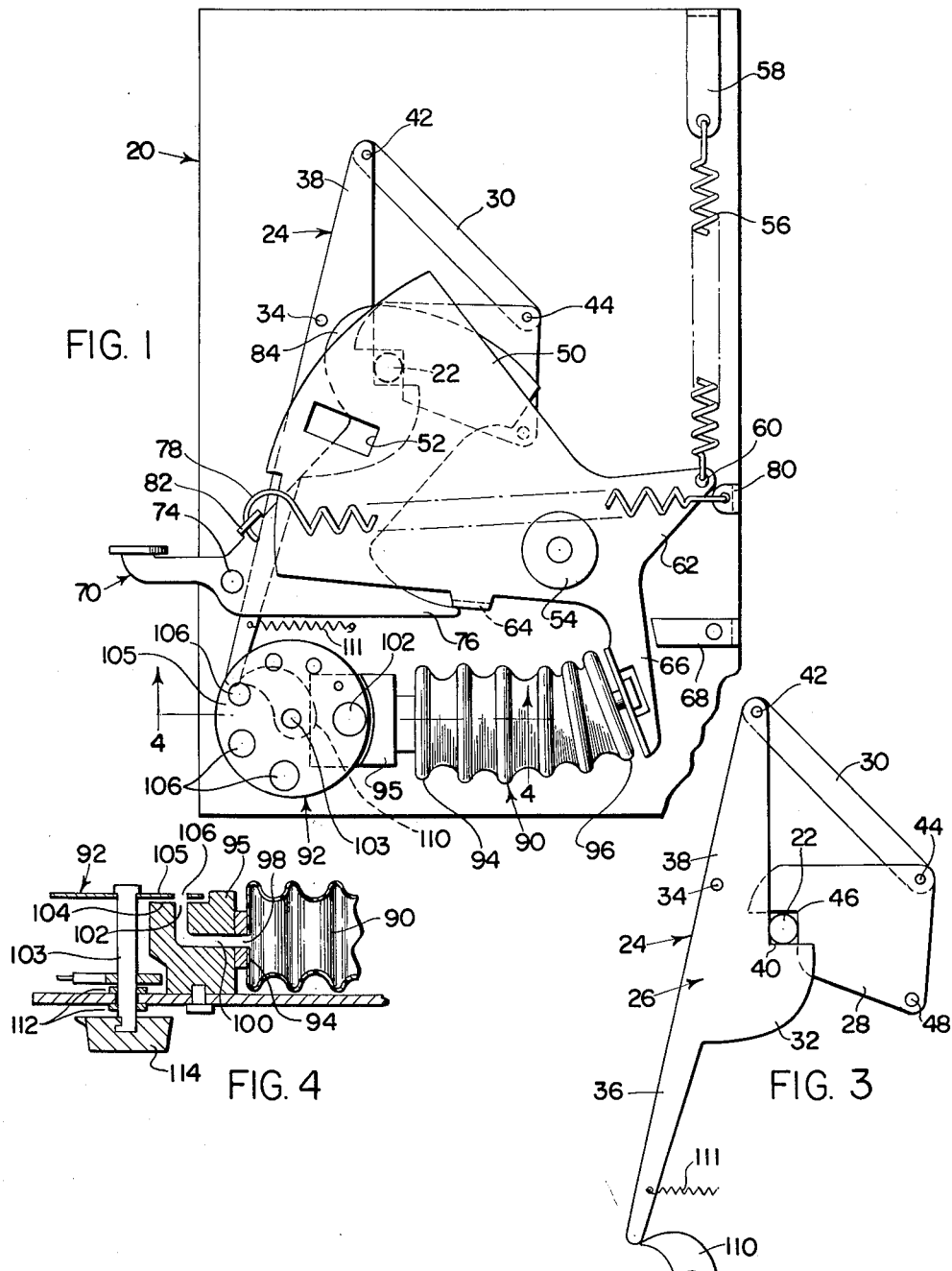
FIGURE 1 is a front plan view of a novel shutter with the elements thereof at a position of rest.
Figure 2:
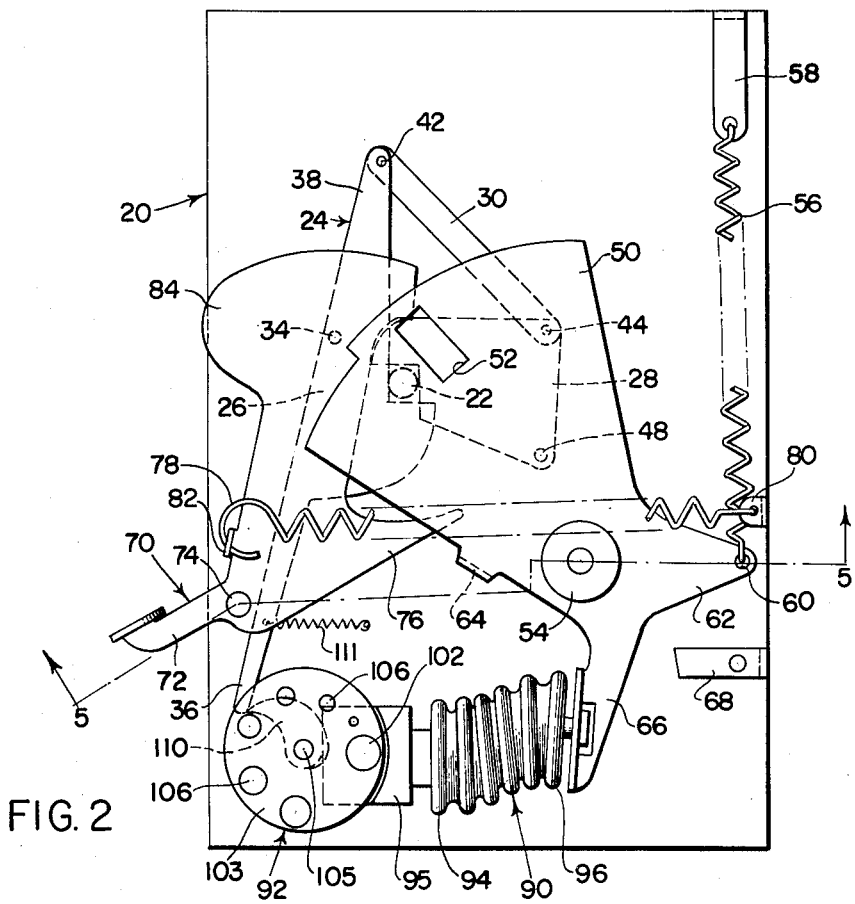
FIG. 2 is a front plan view of the shutter of FIG. 1 with the elements thereof at displaced positions prior to effectuation of exposure.
Figure 5:
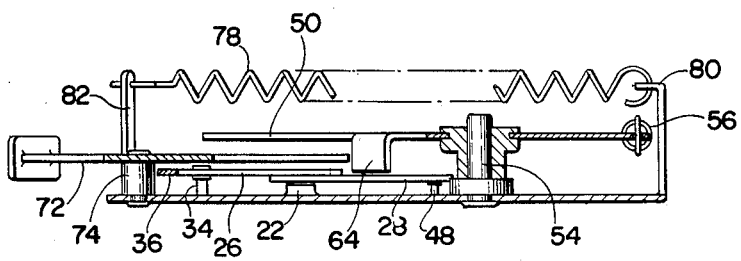
FIG. 5 is a section taken along the line 5—5 of FIG. 2.

Referring now to the drawings wherein like numerals denote like parts, there is shown in FIGS. 1 through 5 a shutter mechanism, comprehended by the present invention, the associated elements of which are represented in FIGS. 1 and 2 as they would appear from a position in front of a camera associated with the shutter mechanism. Directions of rotation and movements of the elements as hereinafter described are those which would be observed when said elements are viewed from the above-described position, the descriptive language being in accordance with the position of observation.

As a means for mounting the operative elements of the shutter mechanism, there is provided a conventional housing which in the form shown comprises a substantially planar plate 20 mounting a conventional lens at lens aperture 22. The housing of course may include side walls (not shown) and a rear portion (not shown) substantially parallel with plate 20 to provide a lighttight enclosure adapted for mounting on a photographic device such as a camera.

As a means for establishing the area of an effective exposure aperture, there is provided, for instance, a diaphragm mechanism, shown in detail in FIG. 3 and indicated generally by the reference numeral 24 which is cooperatively associated with lens aperture 22. Diaphragm 24 is preferably of the double-bladed, linkage type and comprises a first or movable master blade 26 and a second or movable slave blade 28, blades 26 and 28 being connected to one another by means such as link 30. Master blade 26 comprises an elongated member having a wide central portion 32, which is mounted by suitable means such as pivot 34 upon plate 20, and also includes elongated narrow end portions 36 and 38 extending from central portion 32 oppositely to one another. As a means for selectively blocking light from lens aperture 22 and for defining a portion of the periphery of an effective exposure aperture, central portion 32 is provided with an occluding edge which, in the form shown, comprises an approximately right-angled notch 40 disposed on one edge of central portion 32 in operative relation to lens aperture 22. Link 30 is pivotally connected by pivot 42 at one extremity thereof to elongated portion 38 of master blade 26 and is also pivotally connected by pivot 44 at the other extremity thereof to a portion of slave blade 28. Slave blade 28 comprises an approximately quadrilateral element which, in the form shown, includes an approximately right-angled notch 46 at one corner thereof, said notch providing a covering edge for defining the remaining portion of the periphery of the effective exposure aperture. Disposed diagonally across slave blade 28 from notch 46 is pivot 44 providing the pivotal connection between link 30 and slave blade 28. Slave blade 28 is mounted at a third corner thereof upon plate 20 by suitable means such as pivot 48. The diaphragm mechanism thus provided comprises a means for establishing a plurality of effective exposure apertures, a transverse movement of elongated portion 36 for rotating master blade 26 about pivot 34 being transmitted through linkage 30 to slave blade 28 such that both the master blade and the slave blade move to expand or contract an effective exposure aperture defined by the position of the edges of notch 40 and notch 46 relative to aperture 22. It should be noted that the configuration of the angles and edges of the notches may be varied to provide alternatively shaped and sized effective exposure apertures.

To control the passage of light through the effective exposure aperture provided by the combination of diaphragm 24 cooperating with lens aperture 22, there is provided means such as movable shutter blade 50 which comprises a generally flat or planar blade having an opening such as slot 52 therein. At approximately its center, shutter blade 50 is pivotally mounted on plate 20 by suitable means such as a hub-and-post 54. Shutter blade 50 is preferably mounted for pivotal movement about hub 54 between a rest position wherein slot 52 lies to one side of aperture 22 and a displaced position wherein slot 52 lies to an opposite side of aperture 22. Slot 52 is therefore disposed for movement in alignment with and across the effective exposure aperture in a plane substantially normal to the optical axis of and closely adjacent to aperture 22 in order to uncover aperture 22, the duration of an exposure effected thereby being a function of the speed of movement of the slot across the aperture. Blade 50 is preferably shaped to completely cover aperture 22 whenever slot 52 is not crossing the aperture.

Shutter blade 50 is normally biased in a counterclockwise direction by a resilient means such as helical spring 56, spring 56 being anchored at one extremity thereof to tab 58 mounted on plate 20 and at its other extremity to a small hole 60 provided at the extremity of projecting portion 62 of shutter blade 50. Projecting portion 62 preferably extends in the plane of shutter blade 50 and on the opposite side of the hub 54 from slot 52. Blade 50 includes means such as upstanding portion or tab 64 for releasably coupling the blade with an actuating element for rotating the blade from the rest to the displaced or cocked position. Shutter blade 50 is also provided with another extending portion or arm 66 which extends approximately from hub 54 at an angle both to the radius from hub 54 to slot 52 and to projecting portion 62. A limit stop is provided for normally positioning shutter blade 50 in rest position so that a portion of the shutter blade overlies the effective exposure aperture in alignment with lens aperture 22. This limit stop includes a resilient element 68 mounted upon plate 20 and adapted to engage a portion of arm 66 thereby retaining blade 50 against counterclockwise movement beyond the rest position.

As a means for moving shutter blade 50 about its pivotal axis from rest to cocked position, there is provided a movable actuating element indicated generally at 70. Actuating element 70 in the form shown includes an actuating arm 72 which extends preferably outwardly of the planar limits of plate 20 and is adapted for manual engagement by an operator for rotating the actuating element in a counterclockwise direction. Actuating element 70 is mounted approximately centrally thereof on plate 20 for pivotal movement about suitable bearing means, such as pivot 74, and includes a finger portion 76 extending radially from pivot 74 approximately oppositely to actuating arm 72. The actuating element is so disposed on plate 20 that finger portion 76 is adapted to releasably engage tab 64 on shutter blade 50 for rotating the shutter blade in a clockwise direction and against the bias of spring 56 responsively to movement of the actuating arm in a counterclockwise direction. Actuating element 70 is rotatable about bearing means 74 between a first position wherein finger portion 76 is in releasable engagement with tab 64 while blade 50 is in rest position and a second position wherein actuating element 70 has been so rotated that tab 64 and finger portion 76 are no longer engaged. As a means for biasing actuating element 70 into said first position there is provided, in the form shown, a resilient element such as coil spring 78, one extremity of spring 78 being anchored on plate 20 as at 80, the other extremity of spring 78 being attached to upstanding portion 82 on actuating element 70.

As it is desirable to prevent exposure during movement of blade 50 from rest to cocked position, in the preferred form of the invention, actuating element 70 also includes a means such as cover blind portion 84 which, in the form shown, comprises a substantially planar element. Cover blind portion 84 is preferably disposed in covering relation to aperture 22 when actuating element 70 is in its first position and also during that portion of the movement of shutter blade 50 from rest to cocked position during which slot 52 is in alignment with aperture 22. The rotation of the actuating element in a counterclockwise direction so moves cover blind portion that when tab 64 and finger portion 76 are no longer in engagement and shutter blade 50 is therefore free to rotate in a counterclockwise direction to effect an exposure, the cover blind portion has been displaced to an uncovering position relative to aperture 22.

A means for variably controlling the speed of pivotal movement of blade 50 from cocked position to rest position under the bias of spring 56, and therefore controlling the exposure period, is preferably provided as a pneumatic element-and-valve mechanism. Such a mechanism, in the preferred form, comprises an elastic, collapsible and expansible pneumatic element such as bellows 90 and means such as valve element 92 for controlling the rate of expansion or collapse of the pneumatic member. Bellows 90, in the form shown, has a stationary extremity 94 (which is attached to block 95) and has a movable extremity 96 movable toward and away from extremity 94 to expand or collapse the bellows. Although movable extremity 96 may be pivotally attached to a portion of blade 50 or attached by means such as a mechanical linkage well known in the art, in the form shown it is connected by direct attachment to arm portion 66 of blade 50. Extremity 96 is so disposed in the arcuate path of movement of arm 66 that clockwise rotation of blade 50 collapses the bellows. After bellows 90 has been collapsed, rotation of blade 50 in a counterclockwise direction under the bias of spring 56 is accompanied by expansion of the bellows. Bellows 90 is preferably provided in a cylindrical form and is composed of an elastic structural material such as rubber, but is in no sense limited to either the form or material described herein.

As may be seen in FIG. 4, disposed at stationary extremity 94 is an opening 98 through which a gas such as air may be passed in and out of the bellows. Valve element 92 is adapted to control the flow of air through opening 98 in a predetermined manner, preferably during expansion of the bellows, thereby variably controlling or retarding the expansion and thus the counterclockwise pivotal movement of blade 50. Opening 98 is shown in FIG. 4 as connected to a means such as duct or pipe 100 in block 95 for extending the opening to other locations in order to provide a more readily controlled air passage. Pipe 100 terminates in a second opening 102 disposed in a substantially planar surface 104 of block 95. Valve element 92 includes an obstructing member disposed adjacent second opening 102 and fixedly mounted on post 103 for movement in a plane substantially parallel to the plane of surface 104, the obstructing member in the form shown comprising a thin circular disk 105 having a sequence of apertures 106 of varied area therein, the aperture areas varying in size from an aperture approximately equal in area to second opening 102 to an aperture which is very small with relation to opening 102. Apertures 106 may be dimensioned in a predetermined manner to so limit the air flow through opening 102 when in concentric relation thereto as to effect a predetermined blade speed corresponding with the obstructing effect of the dimension of each of said apertures upon the rate of expansion of the bellows. Disk 105 is mounted for rotation with post 103 such that any one of said apertures may be concentrically aligned with opening 102. It should be noted that the clearance preferably provided between the plane of rotation of disk 105 and the plane of surface 104 is sufficient only to allow free rotation of the disk without binding. Disk 105 preferably comprises a thin resilient metal sheet material such as aluminum or steel. It is to be understood that the valve element may be shaped in other forms than hereinbefore described, depending upon the space available and the result desired. For instance, disk 105 may be provided with an arcuate aperture having a tapered width that varies from very narrow to as wide as opening 102, thus providing means for establishing a continuous control of air flow as contrasted to an air flow control by discrete steps as provided by having a plurality of apertures as described.

Also fixedly mounted for rotation with post 103 in stationary relation to disk 105 is means for moving diaphragm 24 for adjusting the relative aperture, this latter means in the form shown comprising a cam member 110 urged into slidable engagement with the extremity of elongated end portion 36 by resilient means such as spring 111. Cam member 110 may have a variety of forms, but preferably is shaped to match the effective exposure apertures, corresponding to predetermined positions of the cam, with the shutter speeds corresponding to each of apertures 106. Post 103 is suitably mounted for rotation on plate 20 by means such as journal bearings 112 and extends through plate 20 exteriorly thereof. Mounted on that extremity of post 103 which extends exteriorly of plate 20 is an adjusting member such as knob 114. Knob 114 may be provided with a fixed index thereon and is rotatable with post 103 for positioning said index adjacent at least one of a plurality of indicia disposed about knob 114 on the exterior of plate 20. It is of course apparent that the plurality of indicia may be inscribed upon knob 114 and the fixed index be disposed upon the housing. The plurality of indicia preferably represent a plurality of exposure values corresponding to predetermined positions of both cam 110 and disk 105, which positions correspond respectively to a relative aperture of the diaphragm and a speed of movement of the shutter blade.

In operation, from the first position of actuating arm 72, wherein actuating arm is positioned as shown in FIG. 1, force applied by an operator rotates arm 72 in a counterclockwise direction against the bias of return spring 78. The rotary movement of arm 72 about pivot 74 is slidably transmitted by finger 76 to tab 64 for rotating shutter blade 50 in a clockwise direction about hub 54 from a rest to displaced position. As arm 72 is rotated counterclockwise and blade 50 rotates accordingly clockwise, slot 52 in blade 50 is brought into an uncovering position wherein the opening overlies and exposes aperture 22. The rotation of arm 72 is, however, accompanied by a rotation of cover blind portion 84 which is so disposed angularly relative to shutter blade 50 that, when slot 52 is in said uncovering position, cover blind portion 84 has been moved into a covering relation to exposure aperture 22 for excluding light. As the counterclockwise rotation of arm 72 continues, blade 50 arrives at the cocked position at which the arcuate path of the extremity of finger 76 no longer intersects the arcuate path of tab 64 and finger 76 disengages from the tab allowing blade 50 to rotate freely counterclockwise under the bias of spring 56.

The rotation of blade 50 in a counterclockwise direction causes slot 52 to move across aperture 22 while cover blind portion 84 has been moved to its second position wherein it no longer covers aperture 22, thereby allowing an exposure to be made. The speed of movement of shutter blade 50 under the bias imposed by spring 56 is controlled or retarded by the movement of air into bellows 90 through opening 102. In the preferred embodiment it is preferable to employ the rate of expansion of bellows 90 as the independent variable for controlling shutter speed although the rate of contraction also may be used as the controlling parameter. The rate of expansion of bellows 90 which causes fluid such as air to be drawn thereinto is limited by the dimension of such one of apertures 106 as may be disposed in alignment with opening 102 at the discretion of the operator. It is to be noted that disk 105 may be provided with a unitary arcuate aperture of continuously varying width adapted to be positioned over aperture 102 regardless of the rotational position of the disk, thereby establishing a "continuous" rather than a "discrete" type of air control. The choice of the one of apertures 106 by an operator is also accompanied by a choice of a position of cam 110 and a corresponding relative aperture of diaphragm 24 caused by the sliding engagement of elongated portion 36 against cam 110 under the bias of spring 111. The choice of one of a plurality of cam positions and corresponding aperture sizes which together determine the particular exposure value desired by the operator is indicated by the relative position of the corresponding plurality of indicia and fixed index as seen from the position of knob 114 relative to plate 20, both cam 110 and disk 105 being movable in fixed relation to axial rotation of post 103 and knob 114.

It is to be understood that the present invention is not limited to use with a diaphragm of the type disclosed but may include diaphragms of the iris type or the like which are subject to establishment of a wide range of effective aperture areas by a cam control. Additionally, the present invention is to be understood as adapted for use with other types of shutter blade mechanisms which are subject to variable speed control by a pneumatic device, examples of such pneumatic devices being seen in U.S. Patent No. 2,800,844, issued July 30, 1957, to J. Durst et al., and the copending U.S. application of Edward M. Purcell et al., Serial No. 711,331, filed January 27, 1958.

Numerous other modifications of this invention will be apparent to those skilled in the art in view of the teachings herein.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A shutter mechanism comprising, in combination, means for defining an exposure aperture, a movable shutter means for covering and uncovering said aperture to effect an exposure through said aperture, means for moving said shutter means, the time interval of said exposure being a function of the speed of the uncovering movement of said shutter means, an expansible and collapsible pneumatic means so connected to said shutter means that the speed of said uncovering movement is a function of the time rate of change of a predetermined dimension of said pneumatic means, movable diaphragm means cooperating with said exposure aperture for variably establishing an effective exposure aperture, and a manually operable, unitary means for controlling exposure, said unitary means including valve means mounted for movement so as to variably control said rate of change of said pneumatic means, and cam means mounted for movement so as to move said diaphragm means, said unitary means being so constructed that said movements of said cam means and said valve means are in predeterminedly fixed relation to one another thereby establishing a plurality of exposure values.

2. A shutter mechanism comprising, in combination, housing means having an exposure aperture therein, a movable shutter element for covering and uncovering said aperture to effect an exposure therethrough, means for moving said blade for uncovering said aperture, the time interval of said exposure being a function of the speed of the uncovering movement of said element, a pneumatic retarding member having a movable portion so connected to said element that the speed of said uncovering movement of said element is a function of the speed of movement of said movable portion of said pneumatic member, movable diaphragm means cooperating with said exposure aperture for variably establishing an effective exposure aperture, and a manually operable, unitary, exposure control means including valve means mounted for movement so as to variably control said rate of change of said pneumatic means, and cam means mounted for movement so as to move said diaphragm means, said exposure control means being so constructed that said movements of said cam means and said valve means are in predeterminedly fixed relation to one another thereby establishing a plurality of exposure values.

3. A shutter mechanism comprising, in combination, means for defining an exposure aperture, a movable shutter element for covering and uncovering said aperture to effect an exposure through said aperture, means for moving said shutter element, the time interval of said exposure being a function of the speed of the uncovering movement of said element, pneumatic means having a movable portion so connected to said element that the speed of uncovering movement of said element is a function of the speed of movement of said movable portion, movable diaphragm means cooperating with said exposure aperture for variably establishing an effective exposure aperture, and manually operable, unitary, exposure control means including valve means mounted for movement so as to variably control said rate of change of said pneumatic means, and cam means mounted for movement so as to move said diaphragm means, said exposure control means being so constructed that said movements of said cam means and said valve means are in predeterminedly fixed relation to one another thereby establishing a plurality of exposure values, said control means also including means for indicating the position of said cam means and valve means relative to said diaphragm means and said pneumatic means respectively.

4. A shutter mechanism comprising, in combination, housing means for defining an exposure aperture, movable diaphragm means cooperating with said exposure aperture for variably establishing an effective exposure aperture, a movable shutter means for covering and uncovering said aperture for establishing exposure time intervals therethrough, pneumatic means having a movable portion so connected to said shutter means that the speed of uncovering movement of said shutter means is a function of the speed of movement of said movable portion of said pneumatic means, the speed of movement of said movable portion being a function of the rate of flow of a gas into said pneumatic means, said pneumatic means having an opening therein for alowing gas-flow in and out of said pneumatic means, and a single, manually operable element for controlling exposure, said manually operable element including a cam portion in slidable engagement with a portion of said diaphragm means and movable for adjusting the latter, and a valve portion mounted for movement for varying the rate of flow of said gas through said opening, said movement of said valve portion being in fixed relation to the varying movement of said cam portion, and means for indicating the relative position of said valve portion and said cam portion respectively to said opening and to said diaphragm means.

5. A shutter mechanism as defined in claim 4 wherein said pneumatic means comprises a bellows.

6. A shutter mechanism as defined in claim 4 wherein said valve portion comprises a rotatable disk having a plurality of apertures of graded size, each of said apertures being so distributed peripherally about said disk as to be movable into alignment with said opening, said disk and said cam portion being rotatable about a common axis provided by said manually operable element.

7. A shutter mechanism as defined in claim 4 wherein said manually operable element comprises a post mounted for rotation upon said housing means and having a portion extending through said housing means, the last-named portion being adapted for manual engagement for rotating said post, said valve portion comprises a substantially planar plate mounted on said post and adapted for movement across said opening for variably obstructing the flow of gas through said opening, and said cam portion is mounted on said post for rotation only in fixed relation to said valve portion.

8. A shutter mechanism comprising, in combination, means for defining an exposure aperture, a movable shutter means for covering and uncovering said aperture to effect an exposure through said aperture, means for moving said shutter means, the time interval of said exposure being a function of the speed of the uncovering movement of said shutter means, an expansible and collapsible pneumatic means so connected to said shutter means that the speed of said uncovering movement is a function of the time rate of change of a predetermined dimension of said pneumatic means, movable diaphragm means cooperating with said exposure aperture for variably establishing an effective exposure aperture, and unitary means for controlling exposure, said unitary means including valve means mounted for movement so as to variably control said rate of change of said pneumatic means, and cam means mounted for movement so as to move said diaphragm means, said unitary means being so constructed that said movements of said cam means and said valve means are in predeterminedly fixed relation to one another thereby establishing a plurality of exposure values.

References Cited in the file of this patent

UNITED STATES PATENTS

| 237,165 | Buchanan | Feb. 1, 1881 |
|---|---|---|
| 477,588 | Barker | June 2, 1892 |
| 534,337 | Mathein | Feb. 19, 1895 |
| 906,862 | Byers | Dec. 15, 1908 |
| 1,104,118 | Holtfoth | July 21, 1914 |
| 2,829,574 | Gebele | Apr. 8, 1958 |
| 2,887,028 | Eburn | May 19, 1959 |